United States Patent Office 3,278,264
Patented Oct. 11, 1966

3,278,264
HYDROGEN IODIDE PRODUCTION
Robert E. Robinson, Houston, and George S. Mill, Pasadena, Tex., assignors to Shell Oil Company, New York, N.Y., a corporation of Delaware
No Drawing. Filed Dec. 11, 1964, Ser. No. 417,789
3 Claims. (Cl. 23—152)

This invention relates to an improved process for the production of hydrogen iodide from elemental iodine.

Hydrogen iodide is a well-known inorganic acid, having considerable utility, for example, in the production of inorganic or organic iodides, as a reducing agent and as a disinfectant. In part because of the difficulty of production, hydrogen iodide has not achieved extensive commercial utilization. Because of the oxidizability of the iodide ion, many methods suitable for the production of other hydrogen halides, e.g., hydrogen chloride and hydrogen bromide, are not applicable to the production of hydrogen iodide. As a consequence, economically expensive methods are employed for the production of this compound. It would be of advantage to provide a more efficient method for the production of hydrogen iodide.

It is an object of the present invention to provide an improved method for the production of hydrogen iodide. A more particular object is to provide an improved method for the production of hydrogen iodide by reaction of elemental iodine with ammonia.

It has now been found that these objects are accomplished by the process of reacting elemental iodine with ammonia in the vapor phase at an elevated temperature in the presence of elemental iron or elemental carbon as catalyst. Although the process of hydrogen iodide production is operable in the absence of such catalysts, the presence of an iron or carbon catalyst greatly increases the conversion of the reactants and hence the efficiency of the reaction process.

The catalysts found to be suitable in the process of the invention are elemental iron, and elemental carbon. In the presence of either, or alternatively a mixture of both, the conversion of iodine to hydrogen iodide by reaction with ammonia under the conditions of the process of the invention is greatly increased. The particular physical design of the catalyst as provided is not critical, and catalysts provided in the physical shape of bars, tubes, rods, powders, spheres, pellets, irregular masses or the like are suitable. The catalyst may be provided as a pure substance or in a mixture with other materials. For example, when iron is employed as the catalyst, the iron is provided as a substantially pure element or is provided as a mixture or alloy with other metals such as nickel, cobalt, molybdenum, tungsten or chromium. Suitable types of carbon to be employed include charcoal, graphite, activated carbon, lamp black, activated charcoal, bone black and similar carbonaceous materials containing a substantial proportion of elemental carbon. Also suitable are mixtures of carbon and iron, e.g., simple physical mixtures of particulate carbon and iron or alloys such as high carbon steels. The success of the process of the invention is not dependent upon any particular amount of catalyst as only sufficient catalyst to enable reactant contacting in the presence of the catalyst is required.

In the presence of the catalysts of the invention, elemental iodine and ammonia are reacted in the vapor phase at an elevated temperature. Without wishing to be bound by any specific theory, it appears that the ammonia functions as a reducing agent and the principal products of the reaction are the desired hydrogen iodide and nitrogen. The probable stoichiometry of such a process would predict the desirability of employing an excess of iodine. However, it has been found desirable to employ a molar excess of ammonia relative to the iodine reactant, and the extent of iodine conversion is in part dependent upon the excess of ammonia that is employed. In general, molar ratios of ammonia to iodine from about 2:1 to about 250:1 are satisfactory, although molar ratios of ammonia to iodine from about 3:1 to about 175:1 are preferred.

The process of the invention is conducted at elevated temperature in the vapor phase. Although any convenient temperature at which the reactants are gaseous is in part operable, best results are obtained when a temperature from about 600° F. to about 1600° F. is employed. The temperature range from about 900° F. to about 1400° F. is particularly satisfactory and is to be preferred. The reaction is conducted at atmospheric, subatmospheric or superatmospheric pressure so long as the reactants are maintained in the vapor phase. Little advantage is gained by utilization of a reaction pressure that is other than about atmospheric and the employment of a substantially atmospheric reaction pressure, e.g., from about 0.25 atmosphere to about 5 atmospheres, is preferred. Due to the apparent enhancement of reactant activity in the presence of the catalysts of the invention, lengthy contact times of reactants and catalyst are not required. Contact times from about 0.1 second to about 5 seconds are satisfactory; contact times from about 0.5 second to about 2 seconds are preferred.

The process of the invention is adaptable for batchwise, semicontinuous or continuous operation. In a preferred modification, the process is conducted in a continuous manner as by passing the gaseous reactants through a tubular reactor in which the catalyst is maintained. The method of mixing is not material, although it is generally preferred to mix the reactants simultaneously with or just prior to introduction into the reactor. It is frequently desirable to employ preheating means to elevate the temperature of one or both of the reactants to the desired reaction temperature prior to initiation of the reaction. The ammonia reactant is conveniently obtained from readily available commercial sources of the gaseous material and is preferably employed in a substantially anhydrous form. It is often convenient to supply the gaseous iodine to the reactor as a vapor-phase mixture with an inert gas such as helium, argon, nitrogen, steam or the like, which serves as a carrier for the iodine vapor. In such a procedure, the carrier gas is contacted with iodine, typically maintained at the desired reaction temperature. The gaseous mixture of iodine and carrier gas is then introduced to the reaction zone wherein it is contacted with ammonia. It is also suitable to conduct the process of the invention in the presence of other materials which are not deleterious to the desired reaction. The process is operable in the presence of solid or molten inorganic materials as well as organic compounds which do not adversely affect the desired reaction.

Subsequent to reaction, the reactor effluent is suitable for use as such as a source of hydrogen iodide, or alternatively the product mixture is separated and the hydrogen iodide recovered by conventional means such as selective condensation, selective absorption, chromatographic separation and the like. A preferred method of separation comprises reacting the hydrogen iodide present in the mixture with a metal oxide at an elevated temperature. The remaining gaseous mixture of nitrogen and ammonia is suitably recycled.

To further illustrate the improved process of the invention, the following example is provided. It should be understood that the details thereof are not to be regarded as limitations, as they may be varied as will be understood by one skilled in this art.

*Example I*

A series of experiments was conducted employing a vertical, tubular Pyrex reactor of 16.5 cm. length and 8 mm. internal diameter. To the reactor was introduced iodine vapor, obtained by passing helium over molten iodine maintained at the desired temperature, and ammonia. The gases emerging from the reactor were passed through a series of two potassium hydroxide traps wherein hydrogen iodide, unconverted iodine and ammonia were trapped for subsequent analysis, and the gas emerging from the traps was analyzed by mass spectrometry. In certain experiments, activated charcoal was supplied as catalyst, and in other experiments, small pieces of stainless steel tube were employed to provide the iron catalyst. The results of this series are shown in Table I.

TABLE I

| Catalyst | Temp., °F. | Molar ratio, $NH_3/I_2$ | Initial $I_2$ concentration, percent mole | Residence time, sec. | $I_2$ conversion, percent based upon— | |
|---|---|---|---|---|---|---|
| | | | | | $I_2$ recovered | $N_2$ yield |
| None | 750 | 3.8 | 13.4 | 1.2 | 22 | 30 |
| None | 1,025 | 3.7 | 13.7 | 1.0 | 20 | 21 |
| None | 1,025 | 6.7 | 7.4 | 0.97 | 21 | 21 |
| Carbon | 1,025 | 6.3 | 7.8 | <1 | 64 | 58 |
| Carbon | 1,025 | 4.0 | 12.8 | <1 | 59 | 51 |
| Carbon | 1,025 | 4.4 | 11.7 | <1 | 62 | 58 |
| None | 1,025 | 107 | 0.47 | 0.97 | 19 | |
| None | 1,025 | 101 | 0.51 | 0.98 | 17 | |
| Carbon | 1,025 | 80 | 0.63 | <1 | 99 | |
| Carbon | 1,025 | 79 | 0.66 | <1 | 97 | |
| Iron | 1,025 | 150 | 0.34 | <1 | 91 | |
| Iron | 1,025 | 89 | 0.57 | <1 | 99 | |

We claim as our invention:

1. The process of producing hydrogen iodide from iodine, which comprises intimately contacting said iodine with ammonia in the vapor phase at about 600° F. to about 1600° F. for a contact time of from about 0.1 to about 5 seconds using at least 4 moles of ammonia per mole of iodine in the presence of elemental iron catalyst and subsequently separating hydrogen iodide thus produced.

2. A process in accordance with claim 1 wherein 4 to about 250 moles of ammonia are used per mole of iodine.

3. A process in accordance with claim 2 wherein 4 to about 175 moles of ammonia are used per mole of iodine at a temperature of about 900° F. to about 1400° F.

References Cited by the Examiner

UNITED STATES PATENTS 1,907,975  5/1933  Jones _____ 23—89 X

OTHER REFERENCES

J. W. Mellor's "A Comprehensive Treatise on Inorganic and Theoretical Chemistry," volume 2, 1922 edition, pages 616 and 617; Longmans, Green & Co., New York.

Lange's "Handbook of Chemistry," 1961 ed., 10th ed., pages 258–259; McGraw-Hill Book Co., Inc., New York.

OSCAR R. VERTIZ, *Primary Examiner.*

EDWARD STERN, *Examiner.*